(12) United States Patent
Kwan

(10) Patent No.: US 7,198,365 B2
(45) Date of Patent: Apr. 3, 2007

(54) SPECTACLE ACCESSORY

(75) Inventor: Po Kwong Kwan, Hong Kong (CN)

(73) Assignee: Faith Idea Limited, Kowloon (HK)

( * ) Notice: Subject to any disclaimer, the term of this patent is extended or adjusted under 35 U.S.C. 154(b) by 0 days.

(21) Appl. No.: 11/081,332

(22) Filed: Mar. 15, 2005

(65) Prior Publication Data

US 2006/0158604 A1    Jul. 20, 2006

(30) Foreign Application Priority Data

Jan. 19, 2005    (CN) .......................... 2005 2 0001154

(51) Int. Cl.
*G02C 9/00* (2006.01)
(52) U.S. Cl. .......................................... 351/48; 351/58
(58) Field of Classification Search .................. 351/41, 351/44, 47, 48, 57, 58
See application file for complete search history.

(56) References Cited

U.S. PATENT DOCUMENTS 5,164,749 A * 11/1992 Shelton ........................ 351/47
5,598,232 A * 1/1997 Pronesti ........................ 351/54
6,783,234 B1 * 8/2004 Hong ............................ 351/47

* cited by examiner

*Primary Examiner*—Huy K. Mai
(74) *Attorney, Agent, or Firm*—Smith-Hill and Bedell

(57) ABSTRACT

A spectacle accessory (100, 200, 300, 400, 500) is disclosed as including a pair of lenses (102, 202, 302, 402, 502), a pair of legs (110, 210, 310, 410, 510) engaged with the pair of lenses (102, 202, 302, 402, 502) and swivellably movable relative thereto, a tube (104, 204, 304, 404, 504) with an interior surface, a wire (108, 208, 308, 408, 508) partly received within the tube (104, 204, 304, 404, 504), wherein the tube (104, 204, 304, 404, 504) is fixedly engaged with the lenses (102, 202, 302, 402, 502) and the wire (108, 208, 308, 408, 508) is fixed engaged with the legs (110, 210, 310, 410, 510), and the wire (108, 208, 308, 408, 508) includes a protruding portion (114, 214, 314, 414, 514) and the wire (108, 208, 308, 408, 508) is swivellably movable relative to the tube (104, 204, 304, 404, 504) between a stable first position in which the protruding portion (114, 214, 314, 414, 514) is clear of the interior surface of the tube (104, 204, 304, 404, 504) and a second position in which the protruding portion (114, 214, 314, 414, 514) abuts the interior surface of tube (104, 204, 304, 404, 504).

13 Claims, 8 Drawing Sheets

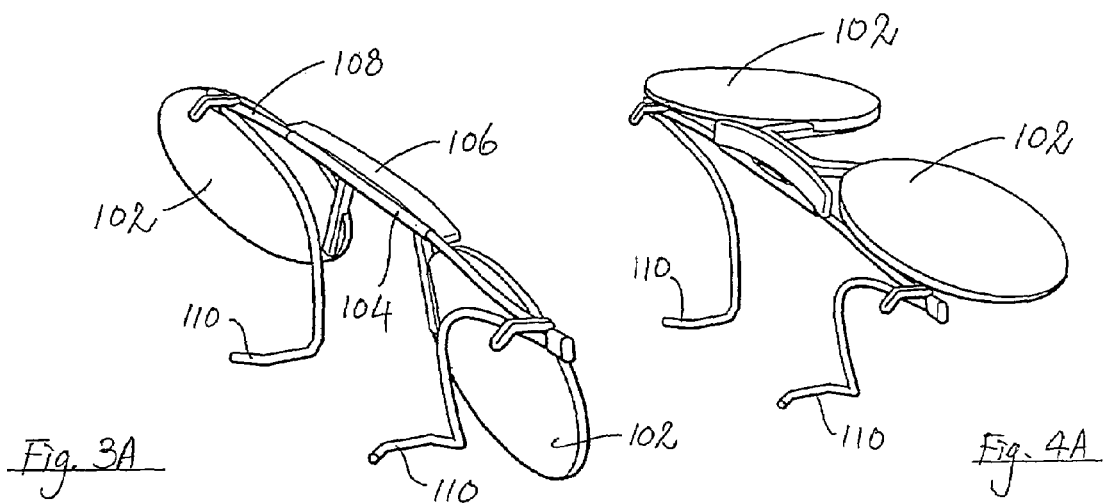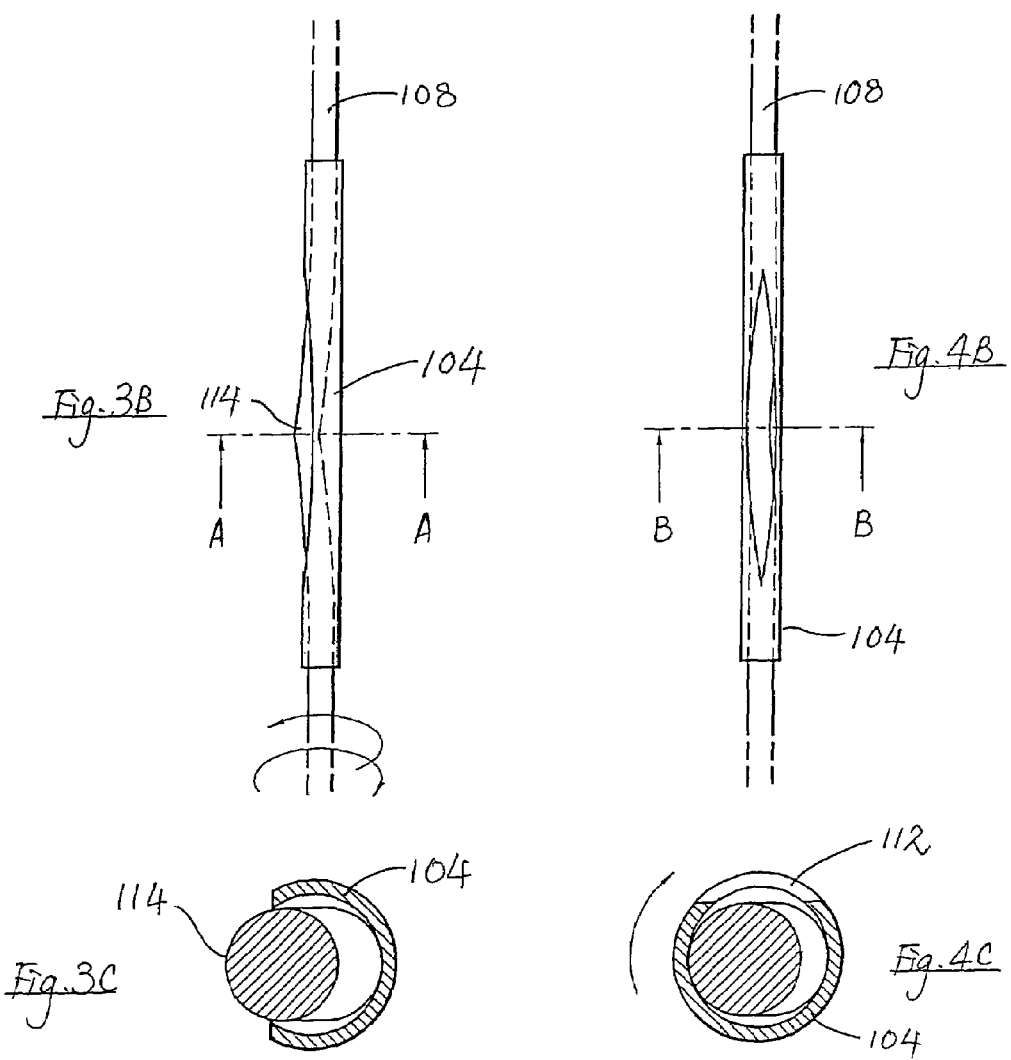

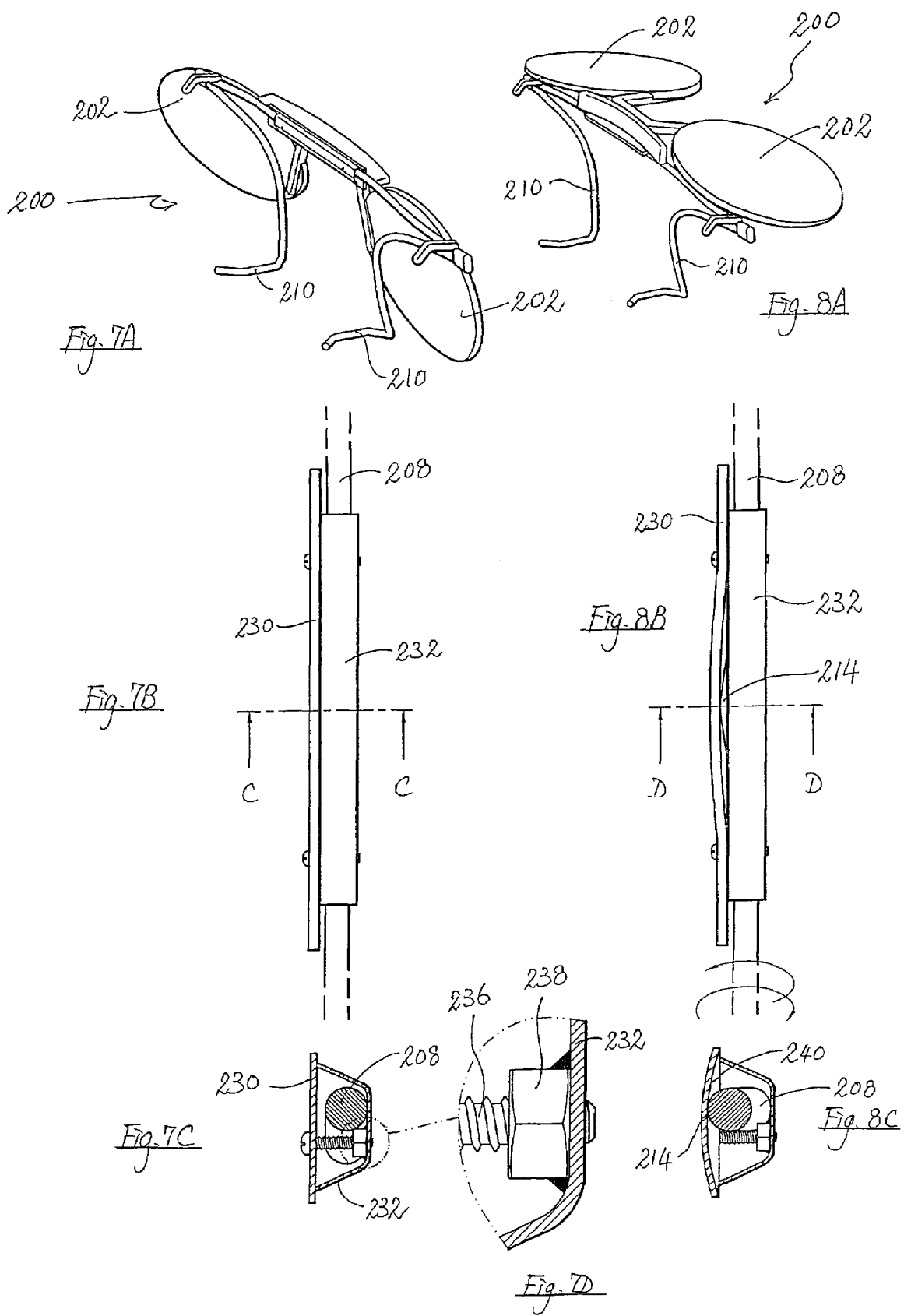

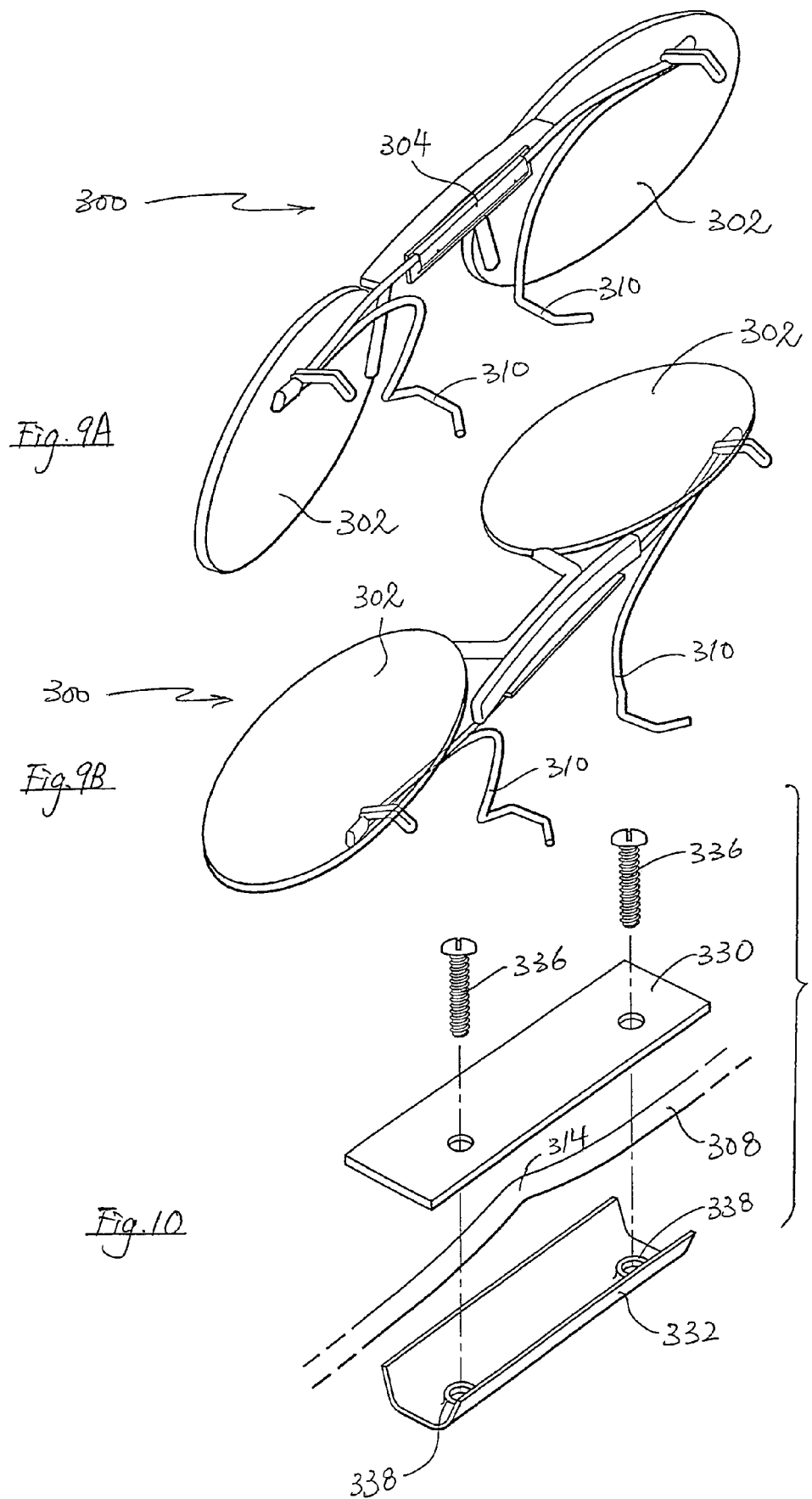

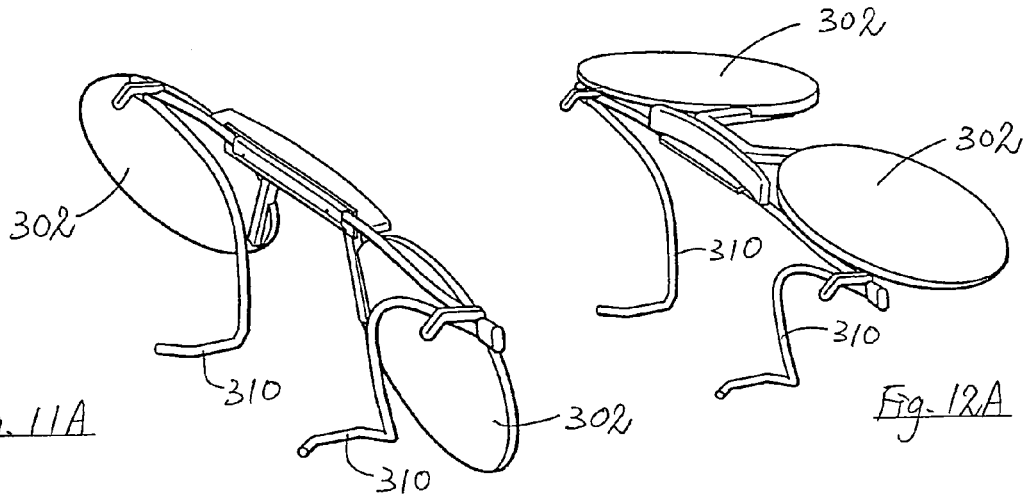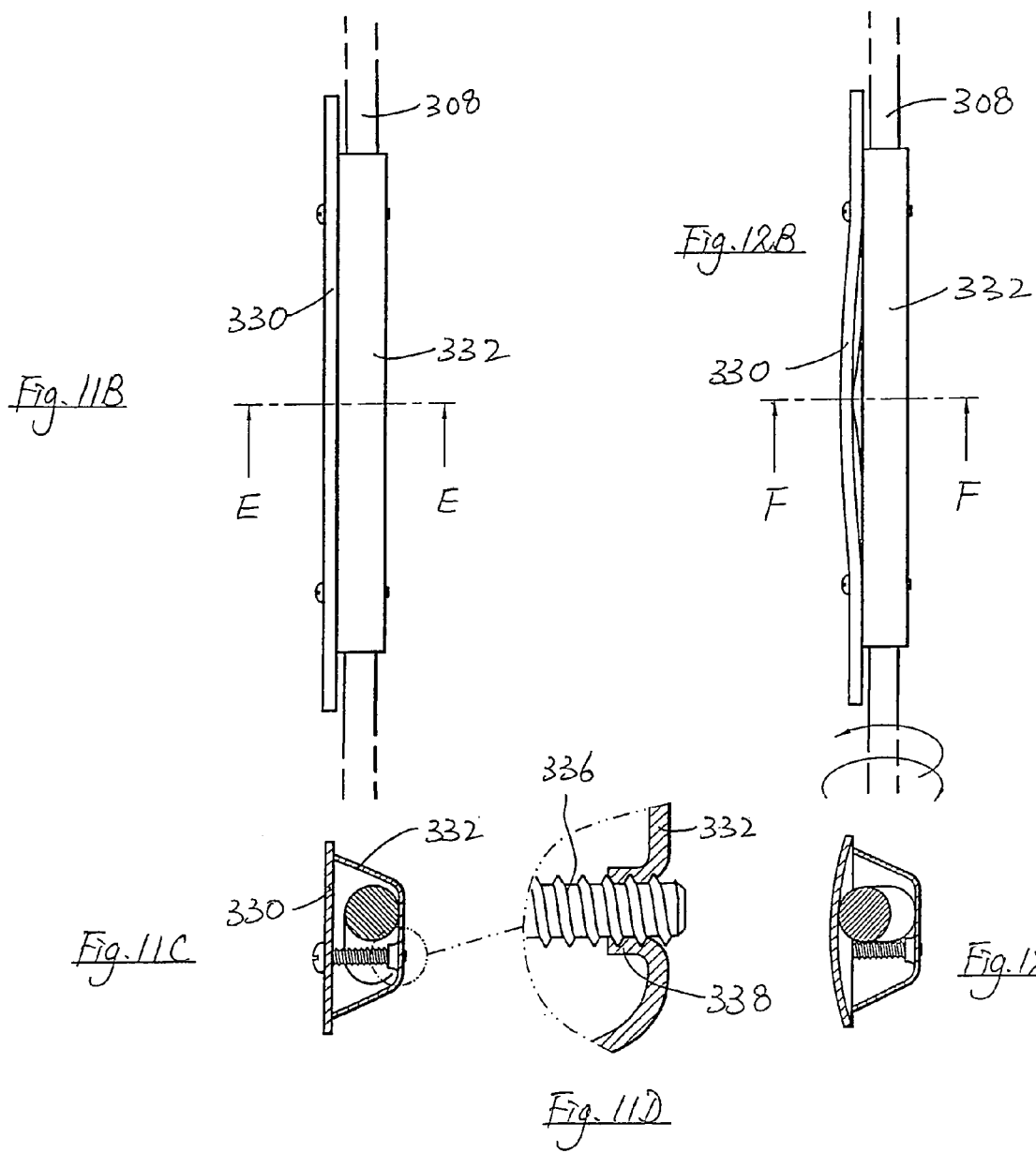

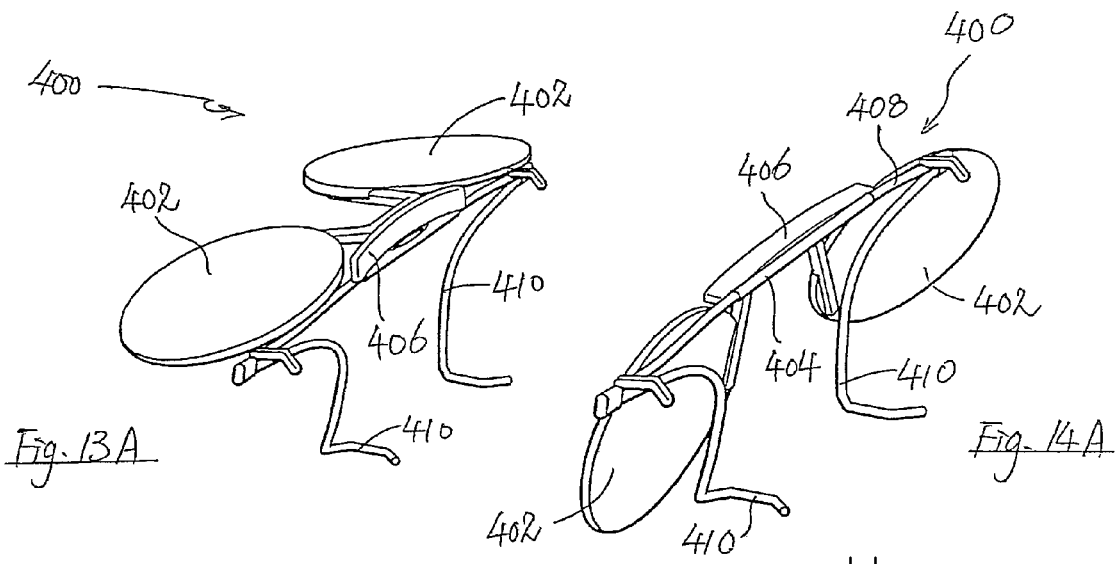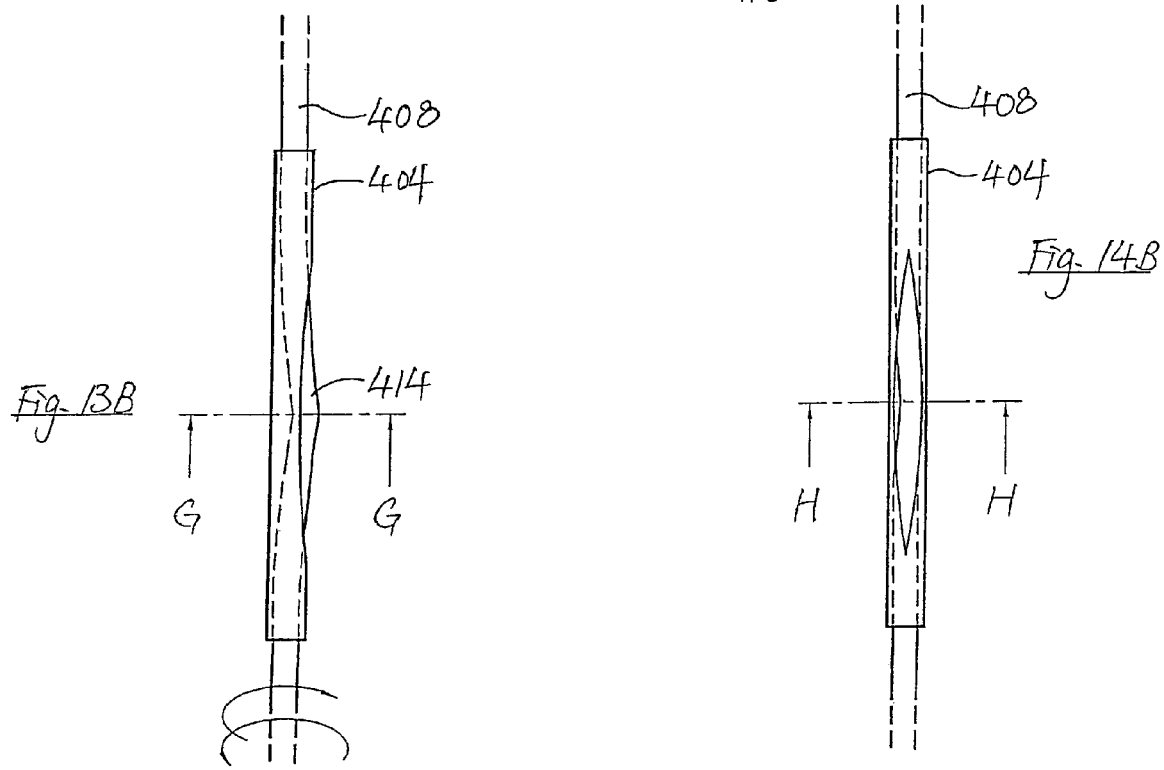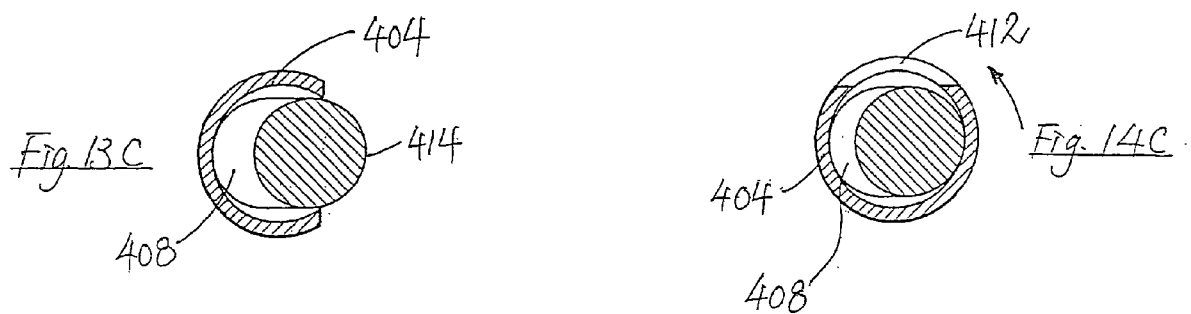

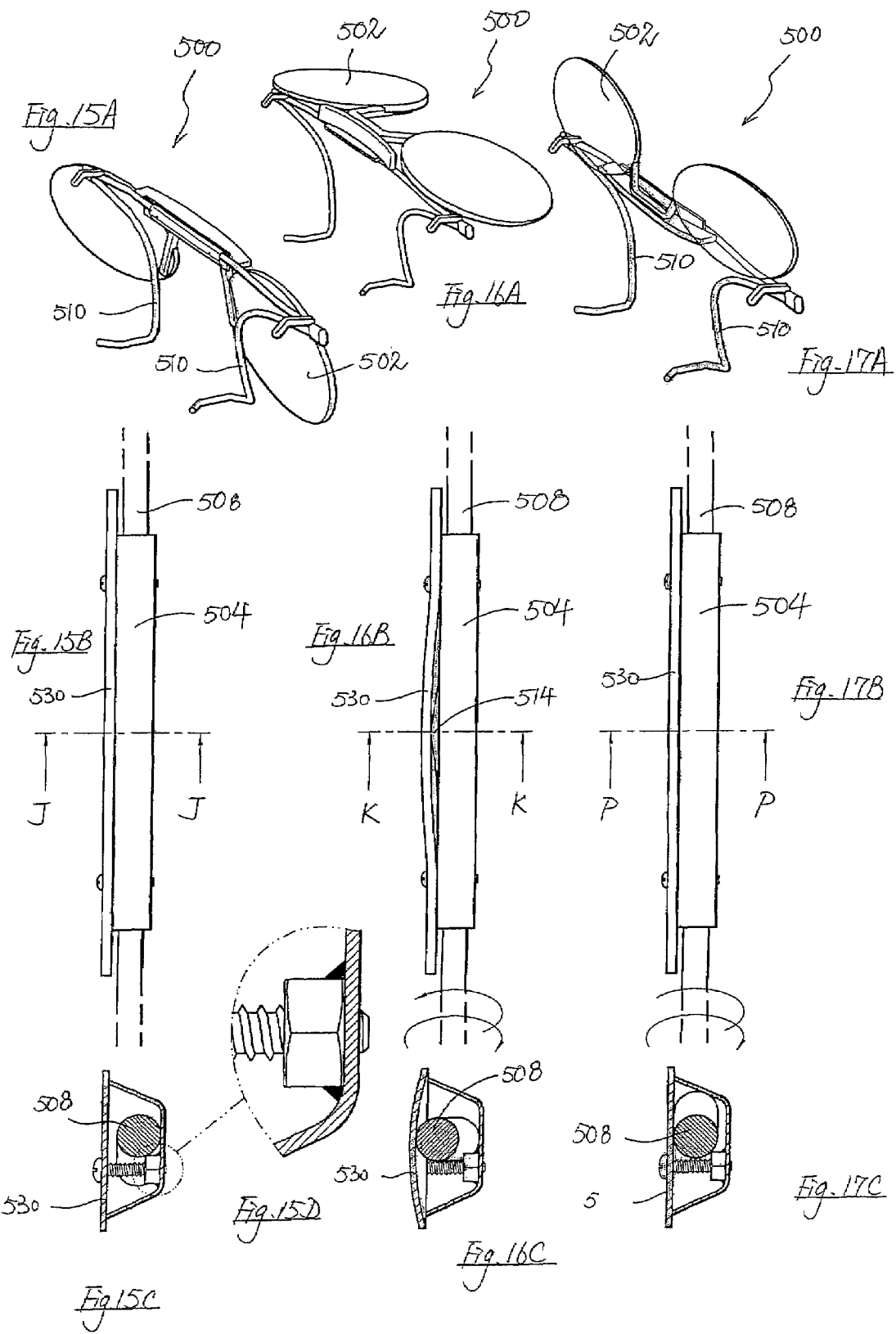

SPECTACLE ACCESSORY

CROSS-REFERENCE TO RELATED APPLICATION

This application claims priority of Chinese Patent Application No. 200520001154.9 filed Jan. 19, 2005.

This invention relates to a spectacle accessory, in particular such an accessory which may be used for releasably attaching a pair of sunglasses to a pair of spectacles.

According to the present invention, there is provided a spectacle accessory comprising a pair of lenses; engagement means secured with said pair of lenses and swivellably movable relative thereto; a tube member with an interior surface; a wire member at least partly received within said tube member; wherein either said tube member is fixedly engaged with said lenses and said wire member is fixed engaged with said engagement means, or said tube member is fixedly engaged with said engagement means and said wire member is fixed engaged with said lenses; characterized in that said wire member includes at least one protrusion, and said wire member is swivellably movable relative to said tube member between a stable first position in which said protrusion is clear of said interior surface of said tube member and a second position in which said protrusion abuts said interior surface of said tube member.

Embodiments of the present invention will now be described, by way of examples only, with reference to the accompanying drawings in which:

FIG. 3A is a perspective view of the spectacle accessory as shown in FIG. 1A with the pair of lenses in the lowered position;

FIG. 3B is an exaggerated view showing the relative position between the tube and the wire when the spectacle accessory is in the configuration as shown in FIG. 3A;

FIG. 3C is a cross-sectional view taken along the line A—A in FIG. 3B;

FIG. 4A is a perspective view of the spectacle accessory as shown in FIG. 1A with the pair of lenses in the raised position;

FIG. 4B is an exaggerated view showing the relative position between the tube and the wire when the spectacle accessory is in the configuration as shown in FIG. 4A;

FIG. 4C is a cross-sectional view taken along the line B—B in FIG. 4B;

FIG. 7A is a perspective view of the spectacle accessory as shown in FIG. 5A with the pair of lenses in the lowered position;

FIG. 7B shows the relative position between the tube and the wire when the spectacle accessory is in the configuration as shown in FIG. 7A;

FIG. 7C is a cross-sectional view taken along the line C—C in FIG. 7B;

FIG. 7D is an enlarged view of the encircled part in FIG. 7C;

FIG. 8A is a perspective view of the spectacle accessory as shown in FIG. 5A with the pair of lenses in the raised position;

FIG. 8B is an exaggerated view showing the relative position between the tube and the wire when the spectacle accessory is in the configuration as shown in FIG. 8A;

FIG. 8C is a cross-sectional view taken along the line D—D in FIG. 8B;

FIG. 9A is a perspective view of a spectacle accessory according to a third embodiment of the present invention with the pair of lenses in a lowered position;

FIG. 9B is a perspective view of the spectacle accessory shown in FIG. 9A with the pair of lenses in a raised position;

FIG. 10 is an exploded view of the tube and wire assembly in the spectacle accessory shown in FIG. 9A;

FIG. 11A is a perspective view of the spectacle accessory as shown in FIG. 9A with the pair of lenses in the lowered position;

FIG. 11B shows the relative position between the tube and the wire when the spectacle accessory is in the configuration as shown in FIG. 11A;

FIG. 11C is a cross-sectional view taken along the line E—E in FIG. 11B;

FIG. 11D is an enlarged view of the encircled part in FIG. 11C;

FIG. 12A is a perspective view of the spectacle accessory as shown in FIG. 9A with the pair of lenses in the raised position;

FIG. 12B is an exaggerated view showing the relative position between the tube and the wire when the spectacle accessory is in the configuration as shown in FIG. 12A;

FIG. 12C is a cross-sectional view taken along the line F—F in FIG. 12B;

FIG. 13A is a perspective view of a spectacle accessory according to a fourth embodiment of the present invention with the pair of lenses in the raised position;

FIG. 13B is an exaggerated view showing the relative position between the tube and the wire when the spectacle accessory is in the configuration as shown in FIG. 13A;

FIG. 13C is a cross-sectional view taken along the line G—G in FIG. 13B;

FIG. 14A is a perspective view of the spectacle accessory as shown in FIG. 13A with the pair of lenses in the lowered position;

FIG. 14B is an exaggerated view showing the relative position between the tube and the wire when the spectacle accessory is in the configuration as shown in FIG. 14A;

FIG. 14C is a cross-sectional view taken along the line H—H in FIG. 14B;

FIG. 15A is a perspective view of a spectacle accessory according to a fifth embodiment of the present invention with the pair of lenses in the lowered position;

FIG. 15B shows the relative position between the tube and the wire when the spectacle accessory is in the configuration as shown in FIG. 15A;

FIG. 15C is a cross-sectional view taken along the line J—J in FIG. 15B;

FIG. 15D is an enlarged view of the encircled part in FIG. 15C;

FIG. 16A is a perspective view of the spectacle accessory as shown in FIG. 15A with the pair of lenses in a half-raised position;

FIG. 16B is an exaggerated view showing the relative position between the tube and the wire when the spectacle accessory is in the configuration as shown in FIG. 16A;

FIG. 16C is a cross-sectional view taken along the line K—K in FIG. 16B;

FIG. 17A is a perspective view of the spectacle accessory as shown in FIG. 15A with the pair of lenses in a fully-raised position;

FIG. 17B shows the relative position between the tube and the wire when the spectacle accessory is in the configuration as shown in FIG. 17A; and FIG. 17C is a cross-sectional view taken along the line P—P in FIG. 16B.

Figure 1A:
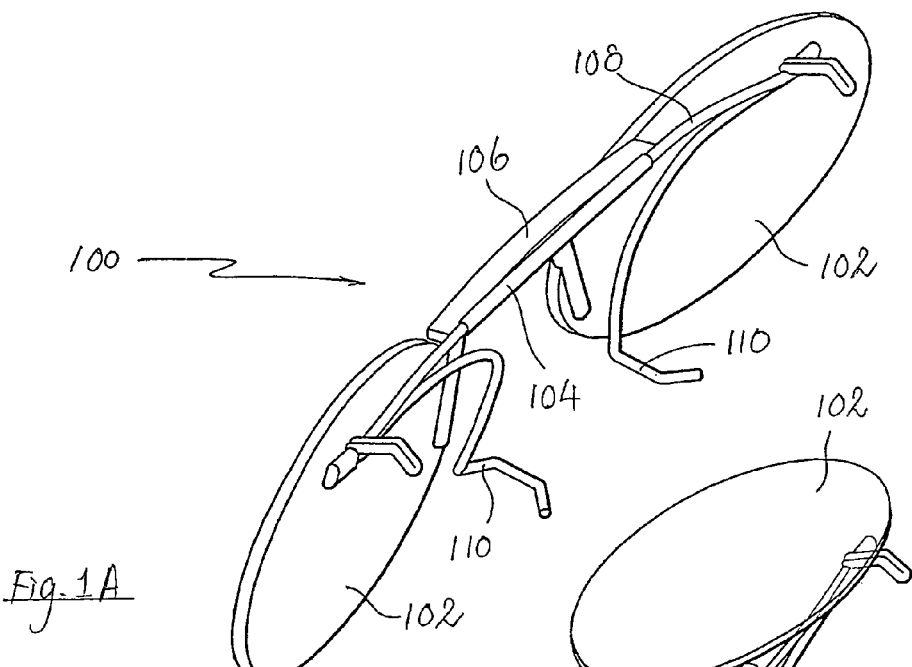
FIG. 1A is a perspective view of a spectacle accessory according to a first embodiment of the present invention with the pair of lenses in a lowered position.
Figure 1B:
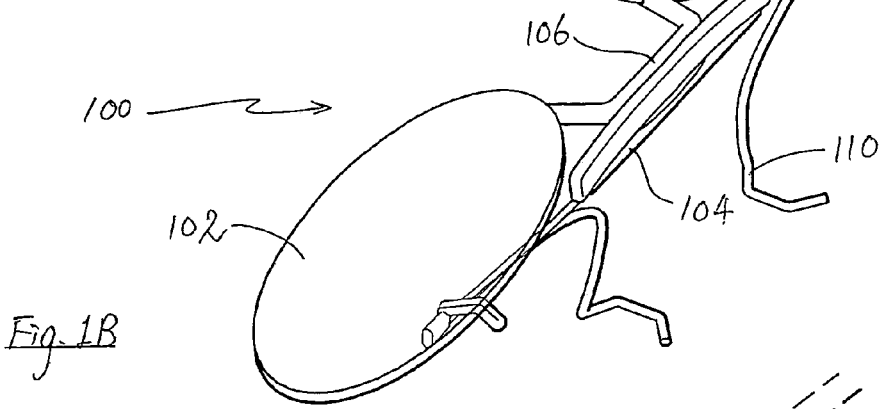
FIG. 1B is a perspective view of the spectacle accessory shown in FIG. 1A with the pair of lenses in a raised position.

Referring firstly to FIGS. 1A to 1B, such show a spectacle accessory according to a first embodiment of the present invention, generally designated as 100. The accessory 100 includes a pair of lenses 102, e.g. sunglass lenses, fixedly engaged with a tube 104 via a bridge 106. Received within the tube 104 is a metal wire 108, adjacent to each longitudinal end of which is fixedly secured a respective leg 110. The legs 110 may be received between the nose pieces and lenses of a pair of eyeglasses (not shown) for releasably attaching the accessory 100 to the pair of eyeglasses. Such will therefore allow a user to convert a pair of untainted eyeglasses into a pair of sunglasses as and when desired.

Figure 2:
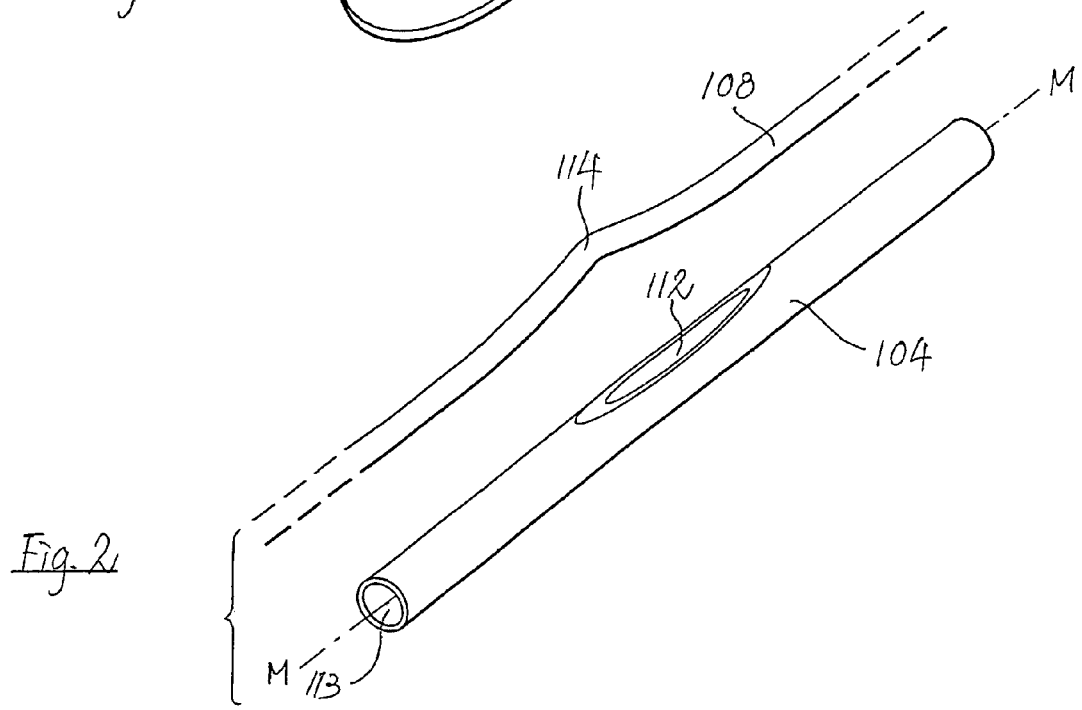
FIG. 2 is an enlarged view of the tube and wire in the spectacle accessory shown in FIG. 1A.

As can be seen in FIG. 2, the tube 104 is generally cylindrical in shape with an elongate opening 112 running lengthwise on its surface, and a channel 113 running therethrough. As to the wire 108, such has a protruding portion 114. When the wire 108 is inserted through the channel 113 of the tube 104, the wire 108 may be rotated within the tube 104 about the longitudinal axis M—M of the tube 104 so as to vary the relative position between the opening 112 and the protruding portion 114.

FIG. 3A shows the pair of lenses 102 in a lowered position, in which the lenses 102 lie next to and contact the legs 110. It can be seen from FIGS. 3B and 3C that when the accessory 100 is in this configuration, the protruding portion 114 of the wire 108 extends through the opening 112 of the tube 104. It can be seen that this is a stable configuration in that if the wire 108 is slightly rotated about the axis M—M relative to the tube 104, the wire 108 will tend to return back to the position shown in FIG. 3B.

When the tube 104 is rotated about its axis M—M by around 90°, the pair of lenses 102 will be swiveled to the raised position as shown in FIG. 4A in which the lenses 102 are generally orthogonal to the legs 110. As shown in FIGS. 4B and 4C, when the accessory 100 is in the configuration as shown in FIG. 4A, the protruding portion 114 of the wire 108 acts against and frictionally engages an interior surface of the tube 104. It should be understood that although the lenses 102 can stay in the raised position shown in FIG. 4A, this is an unstable position as if the tube 104 is slightly rotated relative to the wire 108 in the direction opposite to the arrow shown in FIG. 4C, the lenses 102 will swivel downwardly to the stable position as shown in FIG. 3A.

Figure 5A:
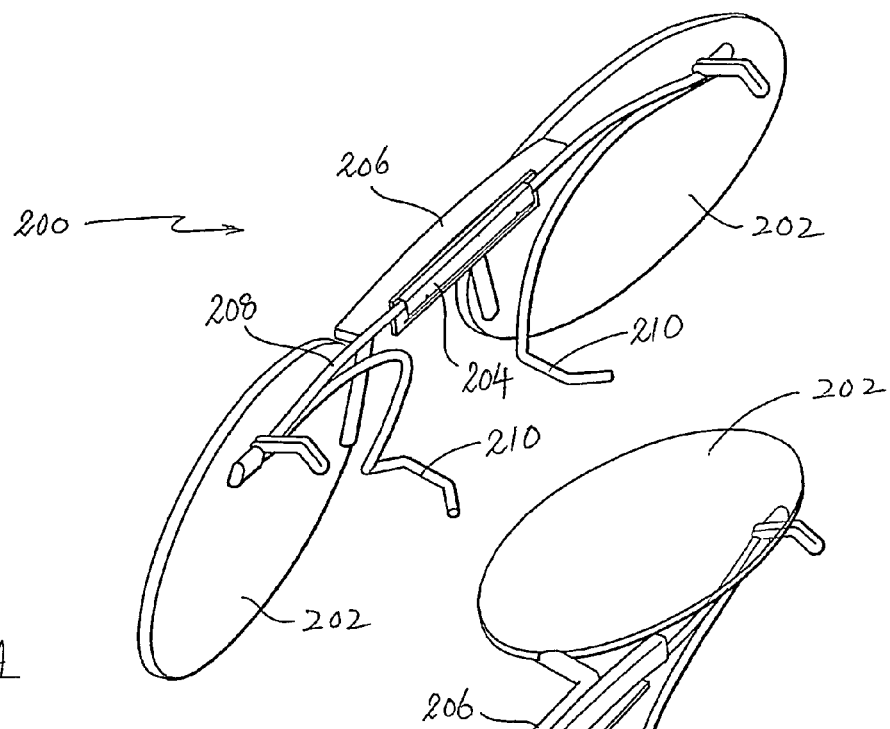
FIG. 5A is a perspective view of a spectacle accessory according to a second embodiment of the present invention with the pair of lenses in a lowered position.
Figure 5B:
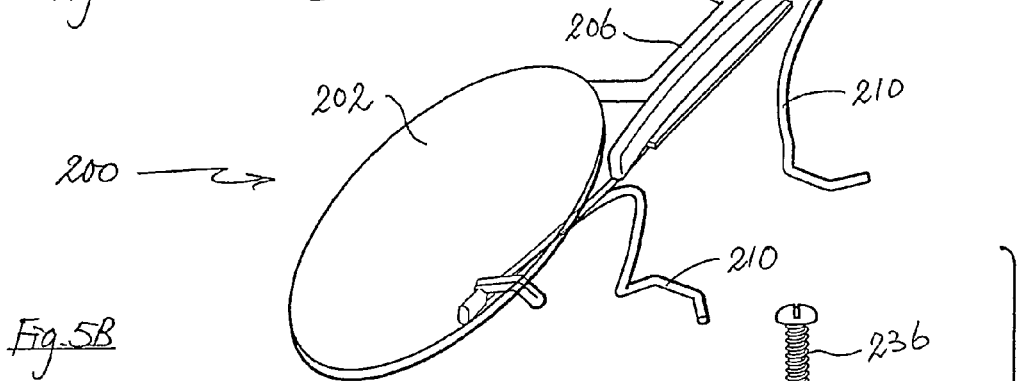
FIG. 5B is a perspective view of the spectacle accessory shown in FIG. 5A with the pair of lenses in a raised position.

Turning now to FIGS. 5A and 5B, such show a spectacle accessory according to a second embodiment of the present invention, generally designated as 200, in a first configuration in which a pair of lenses 202 lie next to and contact a pair of legs 210. The pair of lenses 202 are fixedly engaged with a generally rectangular tube 204 via a bridge 206. The legs 210 are fixedly engaged with a metal wire 208 partly received within a channel of the tube 204. The tube 204 and the lenses 202 fixed engaged therewith are simultaneously swivellable relative to the wire 208 to move the lenses 202 between the raised position as shown in FIG. 5A and the lowered position as shown in FIG. 5B.

Figure 6:
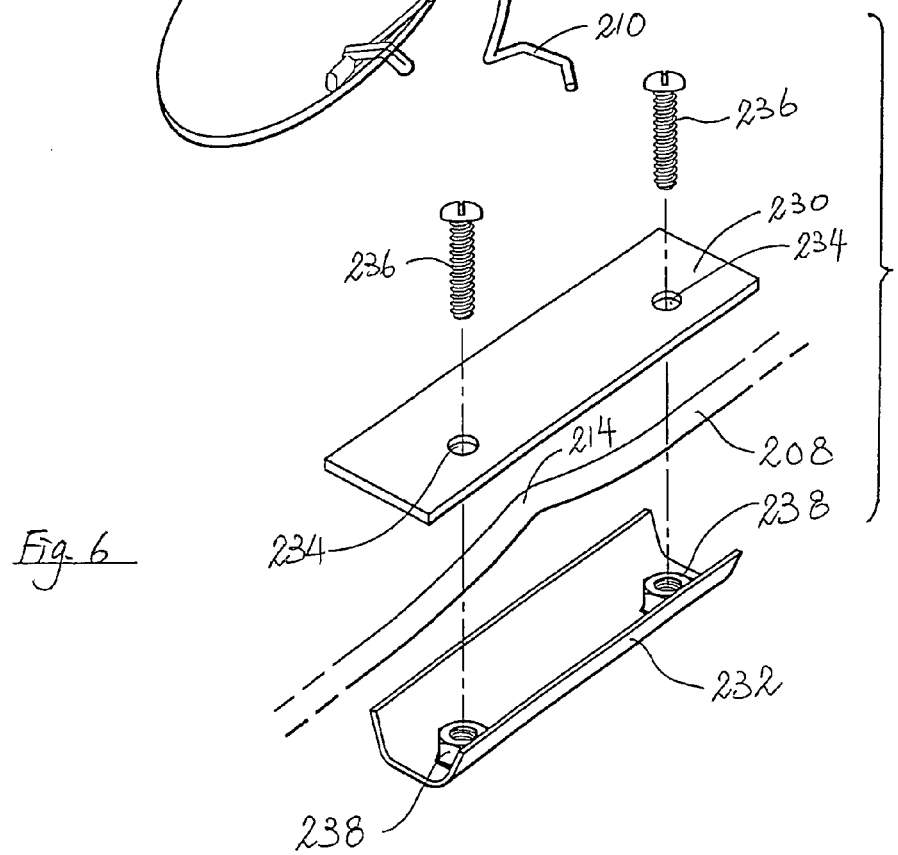
FIG. 6 is an exploded view of the tube and wire assembly in the spectacle accessory shown in FIG. 5A.

As can be seen in FIG. 6, which is an enlarged exploded view showing the assembly of the tube 204 and the wire 208. It can be seen that the wire 208 has a protruding portion 214. The protruding portion 214 and the adjacent parts of the wire 208 are received within a cavity defined by a plate 230 and a trough 232, which collectively form the tube 204. The plate 230 has two holes 234 through each of which a screw 236 may extend. Two internally threaded nuts 238 are fixed in the trough 232. By way of such an arrangement, the plate 230 may be secured by the screws 236 with the trough 232 to form the tube 204.

When the accessory 200 is in the configuration as shown in FIG. 7A, in which the pair of lenses 202 are in a lowered position, lying next to and being in contact with the legs 210, the protruding portion 214 of the wire 208 is clear of the interior surface of the tube 204, in particular the plate 230 of the tube 204, as shown in FIGS. 7B and 7C. As shown in FIG. 7D, the screw 236 is received partly within and in threaded engagement with the nuts 238, thus securing the plate 230 with the trough 232.

When the tube 204 is swiveled relative to the wire 208 by 90° to the position as shown in FIGS. 8B and 8C, the pair of lenses 202 will be swiveled upward to the raised position, as shown in FIG. 8A, in which the lenses 202 are generally orthogonal to the legs 210. In FIGS. 8B and 8C, it is exaggeratedly shown that the protruding portion 214 of the wire 208 bears against and acts on an interior surface 240 of the plate 230, which of course exerts a reactive force on the protruding portion 214 of the wire 208.

It can be seen from the foregoing discussion that the accessory 200 is stable when in the configuration shown in FIG. 7A, but unstable when in the configuration shown in FIG. 8A. In particular, the lenses 202 are retained in the raised position by the friction between the protruding portion 214 and the interior surface of the plate 10 230. If the lenses 202 (which are fixedly engaged with the tube 204) are slightly displaced downwardly from the position shown in FIG. 8A, they will swivel all the way until such reach the stable position as shown in FIG. 7A.

FIGS. 9A and 9B show a spectacle accessory according to a third embodiment of the present invention, generally designated as 300, in a first configuration in which a pair of lenses 302 lie next to and contact a pair of legs 310. The structure and construction of the accessory 300 are similar to the accessory 200 discussed above. A wire 308 with a protruding portion 314 is also partly received within a cavity of a tube 304 formed by a plate 330 and a trough 332, which are secured with each other by screws 336.

The main difference between the accessory 300 and the accessory 200 discussed above can be seen in FIG. 11D. As can be seen, instead of having nuts 238 as in the case of the accessory 200, in the trough 332 of the accessory 300 are formed two cylindrical portions 338 integrally with the trough 332 and extending into the trough interior. The cylindrical portions 338 are sized and configured to receive a free end of the screw 336, to thereby secure the plate 330 with the trough 332 to form the tube 304.

An eyeglass accessory according to a fourth embodiment of the present invention is shown in FIGS. 13A to 14C, and generally designated as 400. The structure and construction of this accessory 400 are similar to that of the accessory 100 discussed above. The main difference is that lenses 402 are in a stable position when in the raised position as shown in FIG. 13A and are in an unstable position when in the lowered position as shown in FIG. 14A.

The lenses 402 are fixedly engaged with a tube 404 via a bridge 406 for simultaneous movement. A pair of legs 410 are fixedly engaged with a wire 408 for simultaneous movement. Part of the wire 408 is received within a cavity within the tube 404. In particular, the wire 408 includes a protruding portion 414. When the accessory 400 is in the configuration as shown in FIG. 13A, the protruding portion 414 of the wire 408 extends through an opening 412 on the surface of the tube 404, such that the protruding portion 414 is clear of the internal surface of the tube 404. When the lenses 402 are swiveled downwardly through around 90° to the lowered position as shown in FIG. 14A, the protruding portion 414 of the wire 408 will act on an interior surface of the tube 404. This is an unstable position as, due to the reaction force of the tube 404 on the protruding portion 414 of the wire 408, if the wire 408 is slightly swiveled in the direction indicated by the arrow in FIG. 14C, the wire 408 will swivel to the position as shown in FIG. 13C, to thereby bring the lenses 402 to the raised position, as shown in FIG. 13A.

A fifth embodiment of a spectacle accessory is shown in FIGS. 15A to 17C, generally designated as 500. This spectacle accessory is similar in construction with the spectacle accessory 200 discussed above, and as shown in FIGS. 7A to 8C. The main difference is that, with the accessory 500, the pair of lenses 502 are movable among:

(a) a stable lowered position as shown in FIGS. 15A to 15C, in which the pair of lenses 502 are in a lowered position, and the wire 508 is clear of, and thus not exerting any force on, a plate 530 of a tube 504;

(b) a intermediate position as shown in FIGS. 16A to 16C, in which the pair of lenses 502 are in a half-raised position, in which a protruding portion 514 of the wire 508 acts and exerts force on the plate 530; and (c) a stable fully-raised position as shown in FIGS. 17A to 17C, in which the pair of lenses 502 are in a fully-raised position, and the wire 508 is clear of, and thus not exerting any force on, the plate 530.

It can be seen that when the pair of lenses 502 are moved from the stable lowered position, via the intermediate position, to the stable fully-raised position, the lenses 502 have swiveled through about 180°. It can also be seen that when the pair of lenses 502 are in the fully-raised position as shown in FIGS. 17A to 17C, the lenses 502 are generally co-planar with legs 510.

An advantage associated with this arrangement is that, when the pair of lenses 502 are moved to the fully-raised position as shown in FIGS. 17A to 17C, they will not accidentally fall on their own to the lowered position as shown in FIG. 15A to 15C, because only by a positive mechanical force acting downwardly on the lenses 502 can the pair of lenses 502 pass through the intermediate position as shown in FIGS. 16A to 16C.

Although in all the embodiments discussed above, the tube 104, 204, 304, 404, 504 is fixedly engaged with the respective pair of lenses 102, 202, 302, 402, 502, and the wire 108, 208, 308, 408, 508 is fixed engaged with the respective pair of legs 110, 210, 310, 410, 510, it is envisaged that it is possible to so arrange that the tube is fixedly engaged with the pair of legs whereas the pair of lenses are fixedly engaged with the wire, so that the pair of lenses are swivellably movable relative to the pair of legs when the wire is rotated in the cavity of the tube and relative to the tube.

It should be understood that the above only illustrates examples whereby the present invention may be carried out, and that various modifications and/or alterations may be made thereto without departing from the spirit of the invention.

It should also be understood that certain features of the invention, which are, for clarity, described in the context of separate embodiments, may be provided in combination in a single embodiment. Conversely, various features of the invention which are, for brevity, described in the context of a single embodiment, may also be provided separately or in any appropriate sub-combinations.

The invention claimed is:

1. A spectacle accessory comprising:
   a pair of lenses;
      engagement means secured with said pair of lenses and swivellably movable relative thereto;
      a tube member with an interior surface;
      a wire member at least partly received within said tube member;
      wherein either said tube member is fixedly engaged with said lenses and said wire member is fixedly engaged with said engagement means, or said tube member is fixedly engaged with said engagement means and said wire member is fixedly engaged with said lenses;
      wherein said wire member includes at least one protrusion, and said wire member is swivellably movable relative to said tube member between a stable first position in which said protrusion is clear of said interior surface of said tube member and a second position in which said protrusion abuts said interior surface of said tube member;
      and wherein said tube member includes an opening through a cylindrical surface thereof through which said protrusion of said wire member extends when said wire member is in said stable position.

2. A spectacle accessory according to claim 1 wherein said wire member is swivellably movable relative to said tube member about a longitudinal axis of said tube member.

3. A spectacle accessory according to claim 1 wherein said engagement means is releasably engageable with a pair of eyeglasses for releasably attaching said pair of lenses with said pair of eyeglasses.

4. A spectacle accessory according to claim 1 wherein when said wire member is in said stable first position, said pair of lenses abut at least part of said engagement means.

5. A spectacle accessory according to claim 1 wherein when said wire member is in said second position, said pair of lenses are clear of said engagement means.

6. A spectacle accessory according to claim 5 wherein when said wire member is in said second position, said pair of lenses are generally orthogonal to said engagement means.

7. A spectacle accessory according to claim 1 wherein said tube member is generally cylindrical in shape.

8. A spectacle accessory according to claim 1 wherein said tube member includes a plate member fixedly engaged with a trough member.

9. A spectacle accessory according to claim 1 wherein when said wire member is in said stable first position, said pair of lenses are clear of said engagement means.

10. A spectacle accessory according to claim 1 wherein when said wire member is in said second position, said pair of lenses abut said engagement means.

11. A spectacle accessory according to claim 1 wherein said wire member is swivellably movable relative to said tube member among said stable first position, said second position, and a third position in which said protrusion is clear of said interior surface of said tube member.

12. A spectacle accessory according to claim 11 wherein when said wire member is in said third position, said pair of lenses lies substantially co-planar with said engagement means.

13. A spectacle accessory according to claim 11 wherein said pair of lenses swivel through substantially 180° upon movement between said first and third positions.

* * * * *